United States Patent
Zemany et al.

(10) Patent No.: US 11,698,244 B2
(45) Date of Patent: Jul. 11, 2023

(54) REDUCED NOISE ESTIMATOR

(71) Applicant: BAE Systems Information and Electronic Systems Integration Inc., Nashua, NH (US)

(72) Inventors: Paul D. Zemany, Amherst, NH (US); Matthew F. Chrobak, Groton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 225 days.

(21) Appl. No.: 17/263,941

(22) PCT Filed: Aug. 30, 2019

(86) PCT No.: PCT/US2019/048988
§ 371 (c)(1),
(2) Date: Jan. 28, 2021

(87) PCT Pub. No.: WO2020/086152
PCT Pub. Date: Apr. 30, 2020

(65) Prior Publication Data
US 2021/0231406 A1    Jul. 29, 2021

Related U.S. Application Data

(60) Provisional application No. 62/725,533, filed on Aug. 31, 2018.

(51) Int. Cl.
*F41G 7/00* (2006.01)
*F42B 10/64* (2006.01)

(52) U.S. Cl.
CPC .............. *F41G 7/001* (2013.01); *F42B 10/64* (2013.01)

(58) Field of Classification Search
CPC .................................. F41G 7/001; F42B 10/64
See application file for complete search history.

(56) References Cited

U.S. PATENT DOCUMENTS 6,237,496 B1 *  5/2001  Abbott ................... F42B 10/64
                                                244/3.14
6,573,486 B1 *  6/2003  Ratkovic .................. F41G 7/36
                                                244/3.2

(Continued)

OTHER PUBLICATIONS

International Search Report, PCT/US19/48988, dated May 19, 2020, 9 pages.

*Primary Examiner* — Marcus E Windrich
(74) *Attorney, Agent, or Firm* — Scott J. Asmus; Gary McFaline; Sand, Sebolt & Wernow LPA (57) ABSTRACT

A system and method to aid in guidance, navigation and control of a guided projectile including a precision guidance munition assembly is provided. The system and method obtain raw position data during flight of the guided projectile, the raw position data including a plurality of position data points from the guiding sensor for determining positions of the guided projectile, establish a window including a portion of the plurality of position data points, smooth the portion of the plurality of position data points in the window, and determine a reduced noise position estimate of the guided projectile, based, at least in part, on the smoothed portion of the plurality of position data points in the window. The system and method may determine a velocity estimate of the guided projectile and predict an impact point of the guided projectile relative to a target.

20 Claims, 5 Drawing Sheets

(56) References Cited

U.S. PATENT DOCUMENTS

| | | | |
|---|---|---|---|
| 7,105,790 B2* | 9/2006 | Lamorlette | G01S 19/53 |
| | | | 701/472 |
| 7,524,941 B2 | 12/2009 | Patel et al. | |
| 11,150,062 B1* | 10/2021 | Jankowski | F42B 10/64 |
| 11,342,687 B1* | 5/2022 | Rossman | H01Q 21/067 |
| 2004/0188561 A1* | 9/2004 | Ratkovic | G01C 21/165 |
| | | | 244/3.1 |
| 2011/0267218 A1 | 11/2011 | Graham | |
| 2015/0015869 A1* | 1/2015 | Smith | G01S 17/66 |
| | | | 356/28.5 |
| 2022/0065588 A1* | 3/2022 | Willenbring | F42B 15/01 |
| 2022/0221258 A1* | 7/2022 | Rath | F42B 10/64 |
| 2022/0244027 A1* | 8/2022 | Seward | F42B 10/14 |

* cited by examiner

REDUCED NOISE ESTIMATOR

CROSS REFERENCE TO RELATED APPLICATIONS

This application claims the benefit of U.S. Provisional Patent Application No. 62/725,533, filed Aug. 31, 2018, the content of which is incorporated by reference herein its entirety.

BACKGROUND

Technical Field

The present disclosure relates generally to guiding projectiles. More particularly, the present disclosure relates to a reduced noise estimator. Specifically, the present disclosure relates to a reduced noise position, velocity vector, and impact point estimator of a guided projectile.

Background Information

Guided projectiles are typically limited in how much they can maneuver. Thus, the maneuver authority of a guided projectile is an important component in launching the guided projectile. When the guided projectile is launched from a launch assembly, such as a barrel or gun tube, the guided projectile typically travels along a trajectory, and, if no corrective action is taken, the guided projectile may impact an impact point that is a distance away from the target. In order for the guided projectile to be closer to the target, the trajectory of the guided projectile may need to be modified which typically requires correction to begin early in the flight of the guided projectile. An accurate estimate of the impact point is typically required to correct the trajectory of the guided projectile early in flight. In order to estimate the impact point a low noise measurement of the projectile's velocity vector and position is typically required.

SUMMARY

Issues continue to exist with methods for providing a low noise and a low bias estimate of a guided projectile's position, velocity vector, and impact point from noisy or jammed measurements. The present disclosure provides a system and method to determine reduced noise position estimates, and determine velocity estimates of the guided projectile at certain points along periodic intervals. The system and method of the current disclosure further predict impact points of the guided projectile based, at least in part, on the velocity estimate of the guided projectile at certain points along the periodic intervals.

In one aspect, the present disclosure describes a guided projectile comprising a canard assembly including at least one canard that is moveable, a munition body connected to the canard assembly, a guiding sensor carried by the guided projectile, and at least one non-transitory computer-readable storage medium carried by the guided projectile having instructions encoded thereon that when executed by at least one processor carried by the guided projectile implements operations to aid in guidance, navigation and control of the guided projectile.

The instructions may include obtaining raw position data during flight of the guided projectile, the raw position data including a plurality of position data points for determining positions of the guided projectile, establishing a window including a portion of the plurality of position data points, smoothing the portion of the plurality of position data points in the window, and determining a first reduced noise position estimate of the guided projectile, based, at least in part, on the smoothed portion of the plurality of position data points in the window. In one example, the guiding sensor may be a global positioning system (GPS).

In one example, the smoothing is accomplished by utilizing a curve fit representing an expected trajectory shape of the guided projectile. In one example, the curve fit may be a quadratic fit.

In one example, the portion of the plurality of position data points may include a first obtained position data point representing a first position of the guided projectile at a first time and a subsequent obtained position data point representing a second position of the guided projectile at a second time. The reduced noise position estimate of the guided projectile may represent an estimated position of the guided projectile at the second time.

The instructions may further include predicting a position of the guided projectile representing a future position of the guided projectile at a future time using at least one projectile dynamics model. In one example, the at least one projectile dynamics model may be a three degree-of-freedom (DOF) model.

The instructions may further include determining a second reduced noise position estimate of the guided projectile based, at least in part, on a weighted sum of the first reduced noise position estimate and the predicted position of the guided projectile.

The instructions in one example further include determining a velocity estimate of the guided projectile. In one example, the determination of the velocity estimate is based, at least in part, on the first reduced noise position estimate of the guided projectile.

The instructions in another example includes predicting a velocity estimate of the guided projectile at a future time using the at least one projectile dynamics model. In one example, the at least one projectile dynamics model is a three DOF model.

In one example, the velocity estimate of the guided projectile is a first velocity estimate of the guided projectile and the instructions further include determining a second velocity estimate of the guided projectile based, at least in part, on a weighted sum of the first velocity estimate and the predicted velocity estimate of the guided projectile.

The instructions may further include predicting an impact point of the guided projectile relative to a target. In one example, the prediction is accomplished by utilizing the at least one projectile dynamics model. In one example, the at least one projectile dynamics model is a three DOF model.

The instructions may further include determining whether the guided projectile will miss the target, and commanding the guided projectile to move the at least one canard on the canard assembly in response to a determination that the guided projectile will miss the target.

In another aspect, the present disclosure provides a method comprising firing a guided projectile from a launch assembly towards a target, obtaining raw position data during flight of the guided projectile, the raw position data including a plurality of position data points from a guiding sensor for determining positions of the guided projectile, establishing a window including a portion of the plurality of position data points, smoothing the portion of the plurality of position data points in the window, and determining a reduced noise position estimate of the guided projectile, based, at least in part, on the smoothed portion of the plurality of position data points in the window. The method may further include determining a velocity estimate of the guided projectile and predicting an impact point of the guided projectile relative to the target.

In another aspect, the present disclosure provides a system and method to aid in guidance, navigation and control of a guided projectile. The system and method obtain raw position data during flight of the guided projectile, the raw position data including a plurality of position data points from the guiding sensor for determining positions of the guided projectile, establish a window including a portion of the plurality of position data points, smooth the portion of the plurality of position data points in the window, and determine a reduced noise position estimate of the guided projectile, based, at least in part, on the smoothed portion of the plurality of position data points in the window. The system and method determines a velocity estimate of the guided projectile and predicts an impact point of the guided projectile relative to a target.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
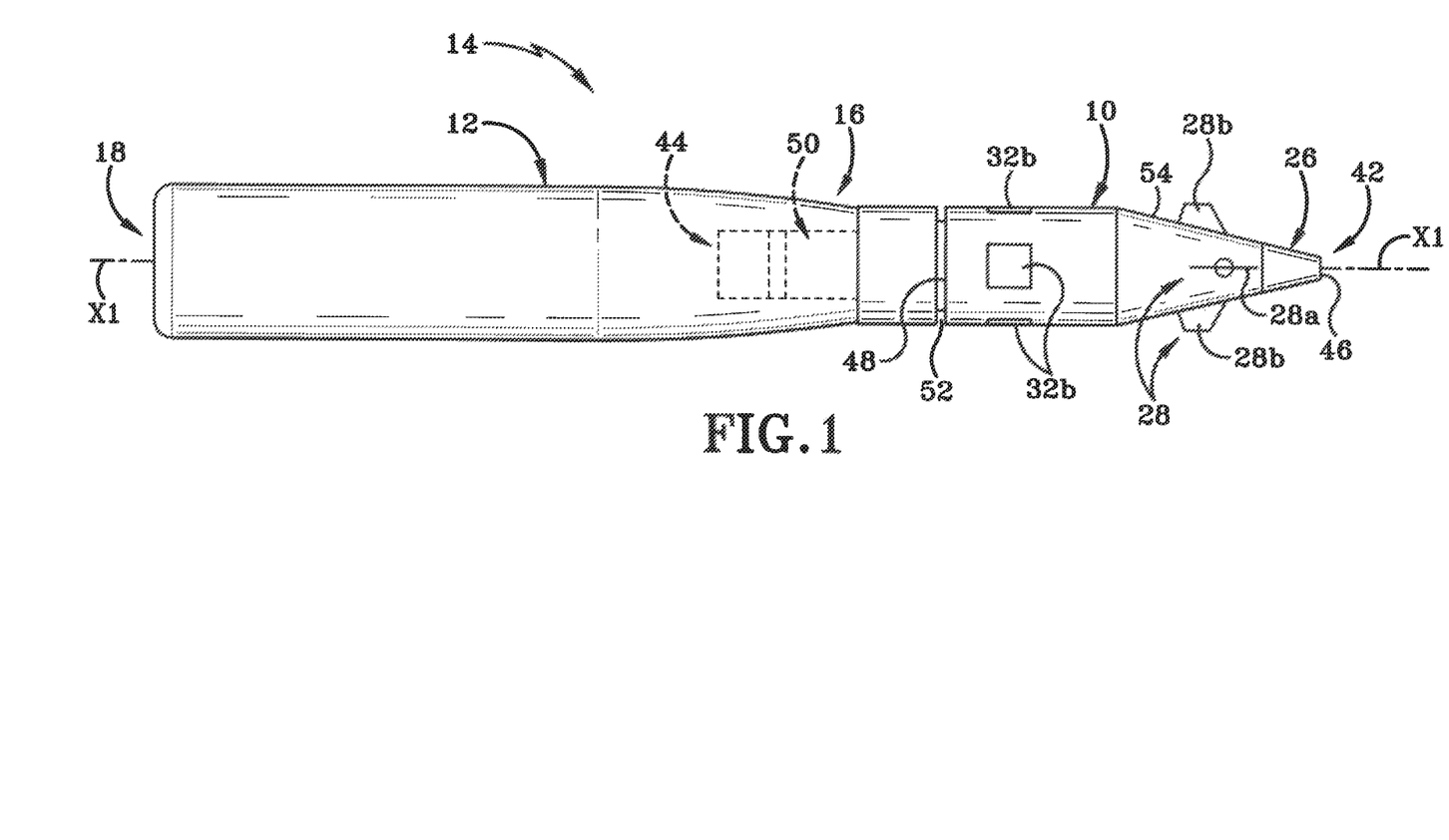
FIG. 1 is a schematic view of a guided projectile including a munition body and a precision guidance munition assembly in accordance with one aspect of the present disclosure.

A precision guidance munition assembly (PGMA), also referred to as a precision guidance kit (PGK) in the art, in accordance with the present disclosure is shown generally at 10. As shown in FIG. 1, the PGMA 10 is operatively coupled with a munition body 12, which may also be referred to as a projectile, to create a guided projectile 14. In one example, the PGMA 10 is connected to the munition body 12 via a threaded connection; however, the PGMA 10 may be connected to the munition body 12 in any suitable manner. In one example, such as the APWKS® precision guidance kit, the PGMA is coupled between the munition body and front end assembly thereby turning the projectile into a precision guided projectile.

Figure 3:
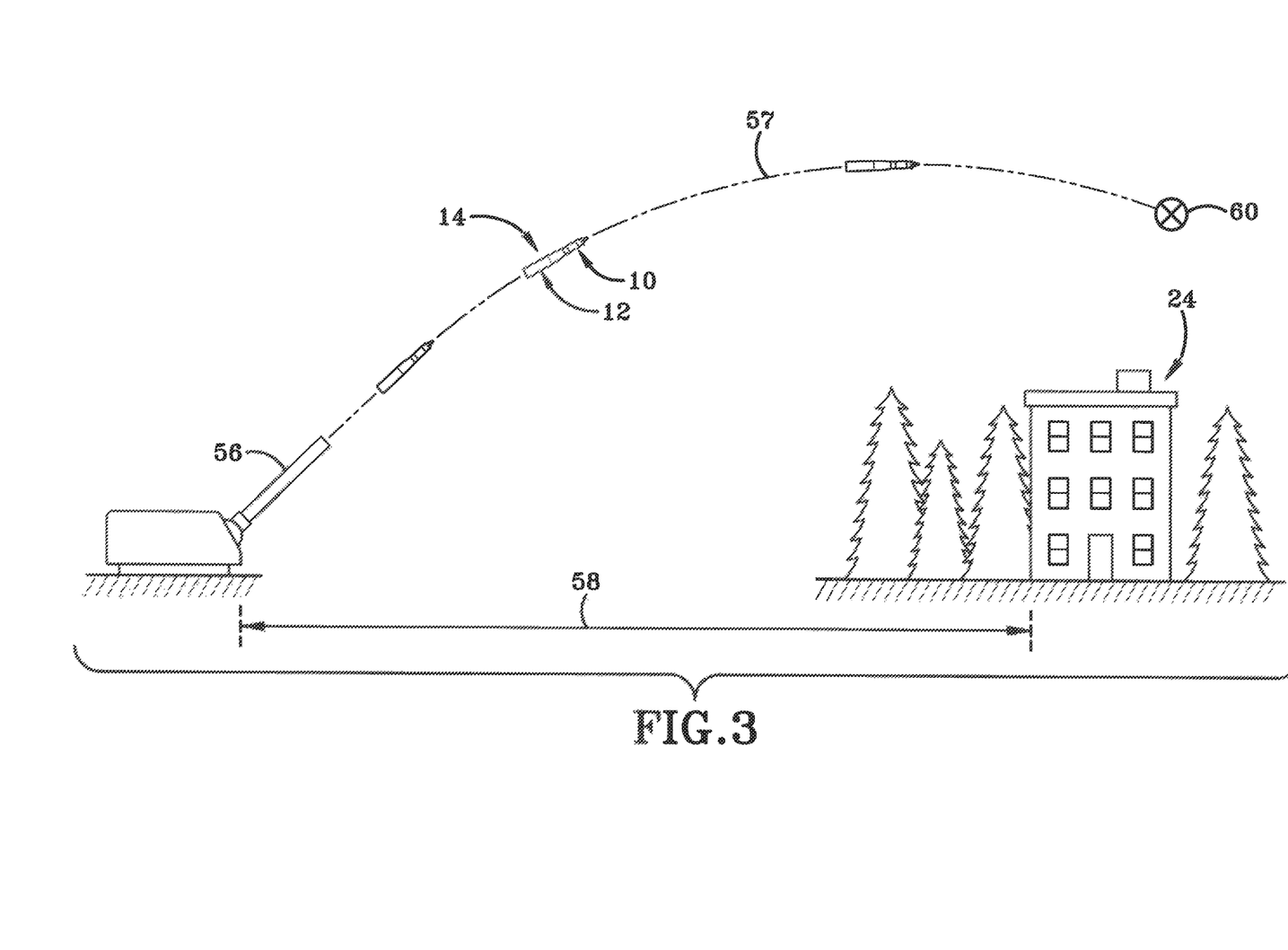
FIG. 3 is an operational schematic view of the guided projectile including the munition body and the precision guidance munition assembly fired from a launch assembly according to one embodiment.

FIG. 1 depicts that the munition body 12 in one example that includes a front end 16 and an opposite tail or rear end 18 defining a longitudinal direction therebetween. The munition body 12 includes a first annular edge 20 (FIG. 1A), which, in one particular embodiment, is a leading edge on the munition body 12 such that the first annular edge 20 is a leading annular edge that is positioned at the front end 16 of the munition body 12. The munition body 12 defines a cylindrical cavity 22 (FIG. 1.A) extending rearward from the first annular edge 20 longitudinally centrally along a center of the munition body 12. The munition body 12 is formed from material, such as metal, that is structurally sufficient to carry an explosive charge configured to detonate or explode at, or near, a target 24 (FIG. 3). The munition body 12 may include tail flights (not shown) which help stabilize the munition body 12 during flight.

Figure 1A:
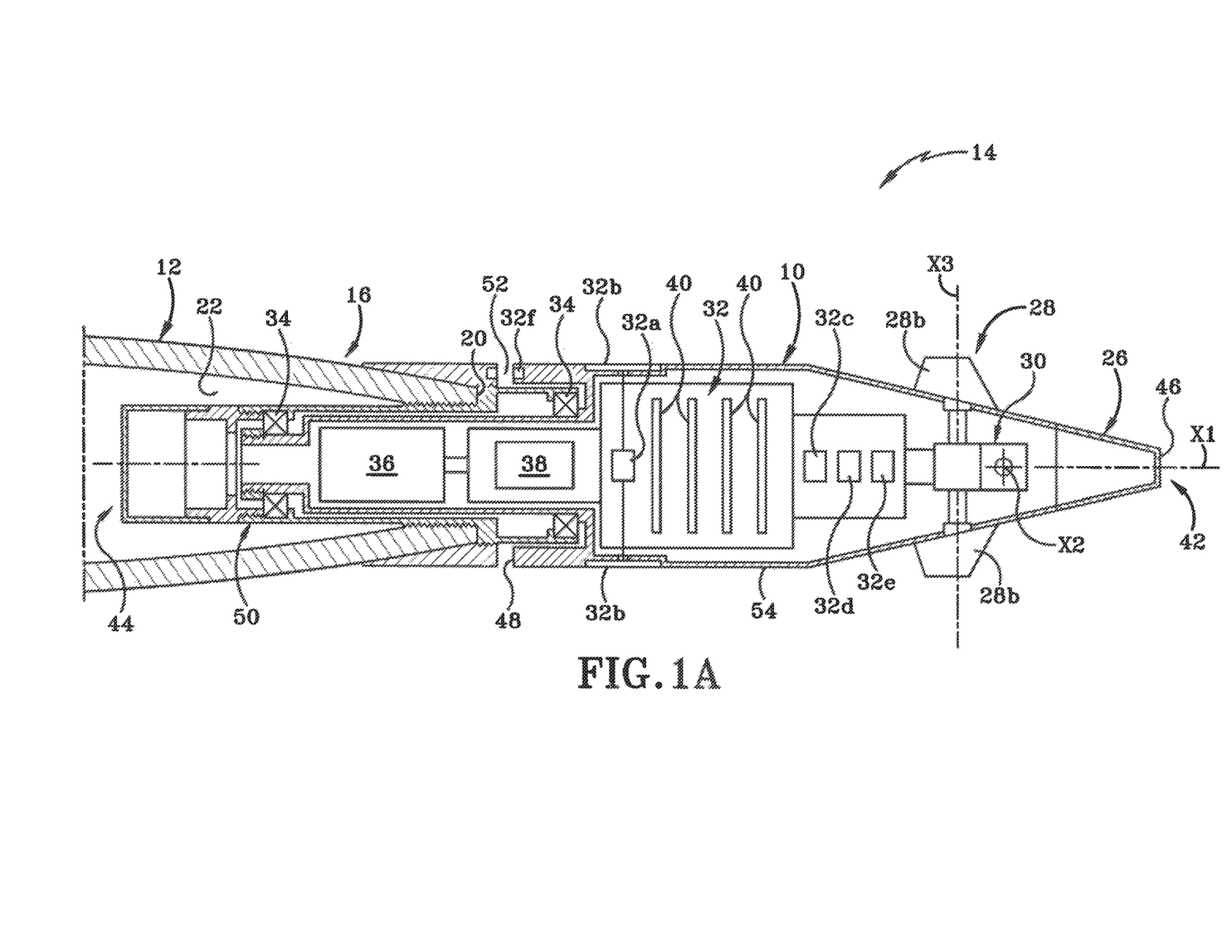
FIG. 1A is an enlarged fragmentary cross-section view of the guided projectile including the munition body and the precision guidance munition assembly in accordance with one aspect of the present disclosure.

FIG. 1A depicts that the PGMA 10, which may also be referred to as a despun assembly, includes, in one example, a fuze setter 26, a canard assembly 28 having one or more canards 28a, 28b, a control actuation system (CAS) 30, a guidance, navigation and control (GNC) section 32 having at least one guiding sensor 32a, such as a global positioning system (GPS), at least one GPS antenna 32b, a magnetometer 32c, a microelectromechanical systems (MEMS) gyroscope 32d, an MEMS accelerometer 32e, and a rotation sensor 32f, at least one bearing 34, a battery 36, at least one non-transitory computer-readable storage medium 38, and at least one processor or microprocessor 40.

Although the GNC section 32 has been described in FIG. 1A as having particular sensors, it should be noted that in other examples the GNC section 32 includes other sensors, including, but not limited to, laser guided sensors, electro-optical sensors, imaging sensors, inertial navigation systems (INSs), inertial measurement units (IMUs), or any other suitable sensors. In one example, the GNC section 32 may include an electro-optical and/or imaging sensor positioned on a forward portion of the PGMA 10. In another example, there may be multiple sensors employed such that the guided projectile 14 can operate in a GPS-denied environment and for highly accurate targeting. The projectile in one example has multiple sensors and switches from one sensor to another during flight. For example, the projectile can employ GPS while it is available but then switch to another sensor for greater accuracy or if the GPS signal is unreliable or no longer available. For example, it may switch to an imaging sensor to hone in to a precise target.

The at least one computer-readable storage medium 38 includes instructions encoded thereon that when executed by the at least one processor 40 carried by the PGMA 10 implements operations to aid in guidance, navigation and control (GNC) of the guided projectile 14.

The PGMA 10 includes a nose or front end 42 and an opposite tail or rear end 44. When the PGMA 10 is connected to the munition body 12, a longitudinal axis X1 extends centrally from the rear end 18 of the munition body to the front end 42 of the PGMA 10. FIG. 1A depicts one embodiment of the PGMA 10 as generally cone-shaped and defines the nose 42 of the PGMA 10. The one or more canards 28a, 28b of the canard assembly 28 are controlled via the CAS 30. The PGMA 10 further includes a forward tip 46 and an annular edge 48. In one embodiment, the second annular edge 48 is a trailing annular edge 48 positioned rearward from the tip 46. The second annular edge 48 is oriented centrally around the longitudinal axis X1. The second annular edge 48 on the canard PGMA 10 is positioned forwardly from the first annular edge 20 on the munition body 12. The PGMA assembly 10 further includes a central cylindrical extension 50 that extends rearward and is received within the cylindrical cavity 22 via a threaded connection.

The second annular edge 48 is shaped and sized complementary to the first annular edge 20. In one particular embodiment, a gap 52 is defined between the second annular edge 48 and the first annular edge 20. The gap 52 may be an annular gap surrounding the extension 50 that is void and free of any objects so as to effectuate the free rotation of the PGMA 10 relative to the munition body 12.

Figure 2:
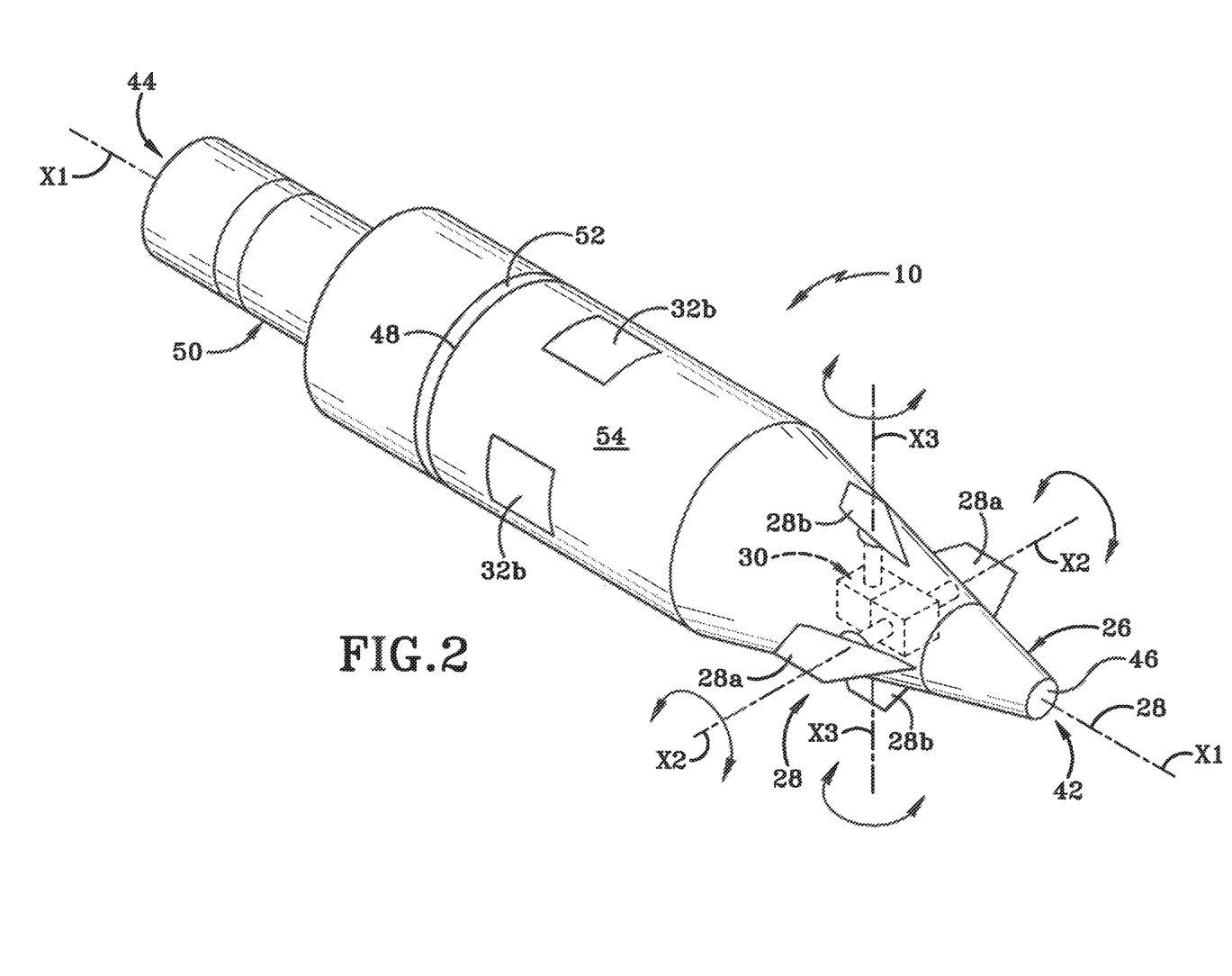
FIG. 2 is a schematic perspective view of precision guidance munition assembly according to one embodiment.

FIG. 2 depicts an embodiment of the precision guidance munition assembly, wherein the PGMA 10 includes at least one lift canard 28a extending radially outward from an exterior surface 54 relative to the longitudinal axis X1. The at least one lift canard 28a is pivotably connected to a portion of the PGMA 10 via the CAS 30 such that the lift canard 28a pivots relative to the exterior surface 54 of the PGMA 10 about a pivot axis X2. In one particular embodiment, the pivot axis X2 of the lift canard 28a intersects the longitudinal axis X1. In one particular embodiment, a second lift canard 28a is located diametrically opposite the at least one lift canard 28a, which could also be referred to as a first lift canard 28a. The second lift canard 28a is structurally similar to the first lift canard 28a such that it pivots about the pivot axis X2. The PGMA 10 can control the pivoting movement of each lift canard 28a via the CAS 30. The first and second lift canards 28a cooperate to control the lift of the guided projectile 14 while it is in motion after being fired from a launch assembly 56 (FIG. 3).

The PGMA 10 in one example further includes at least one roll canard 28b extending radially outward from the exterior surface 54 relative to the longitudinal axis X1. In one example, the at least one roll canard 28b is pivotably connected to a portion of the PGMA 10 via the CAS 30 such that the roll canard 28b pivots relative to the exterior surface 54 of the PGMA 10 about a pivot axis X3. In one particular embodiment, the pivot axis X3 of the roll canard 28b intersects the longitudinal axis X1. In one particular embodiment, a second roll canard 28b is located diametrically opposite the at least one roll canard 28b, which could also be referred to as a first roll canard 28b. The second roll canard 28b is structurally similar to the first roll canard 28b such that it pivots about the pivot axis X3. The PGMA 10 can control the pivoting movement of each roll canard 28b via the CAS 30. The first and second roll canards 28b cooperate to control the roll of the guided projectile 14 while it is in motion after being fired from the launch assembly 56 (FIG. 3). While the launch assembly is shown as a ground vehicle in this example, the launch assembly may also be on vehicles that are air-borne assets or maritime assets. The air-borne assets, for example, includes planes, helicopters and drones.

FIG. 3 depicts the operation of the PGMA 10 according to one example when connected to the munition body 12 forming the guided projectile 14. As shown in FIG. 3, the guided projectile 14 is fired from the launch assembly 56 elevated at a quadrant elevation towards the target 24, located at an estimated or nominal distance 58 from the launch assembly 56. The guided projectile flies along an expected trajectory, 57 towards a predicted impact point 60. As stated above, the at least one computer-readable storage medium 38 includes instructions encoded thereon that when executed by the at least one processor 40 carried by the PGMA 10 implements operations to aid in guidance, navigation and control of the guided projectile 14.

In one example, the instructions include obtaining raw position data points from the guiding sensor 32a during flight of the guided projectile 14. In one example, the raw position data points is position data points obtained from the GPS 32a. The raw position data points in one example includes a plurality of position data points for determining positions of the guided projectile 14 during the flight of the guided projectile 14.

The instructions in one embodiment includes establishing a window including at least a portion of the plurality of position data points. In one example, the window may include five position data points; however, the window may include any suitable number of position data points. In one example, the window may be updated at particular time increments. In one example, the particular time increment of updates may be one second; however, the particular time increment of updates may be any suitable time increment, including, but not limited to uniform and non-uniform time increments. There are obvious limits on the time window as the projectile will impact at or near the target in a short time frame. It should be understood that the projectile detonation may be height of burst or at a specific location about the target that is designed for the specifics of the mission.

The instructions in one example includes smoothing the portion of the plurality of position data points in the window. The smoothing of the plurality of position data points in the window is accomplished by utilizing a curve fit representing an expected trajectory 57 of the guided projectile 14. In one example, the curve fit is a least squares quadratic curve fit; however, the curve fit may be any other suitable curve fit.

Figure 4:
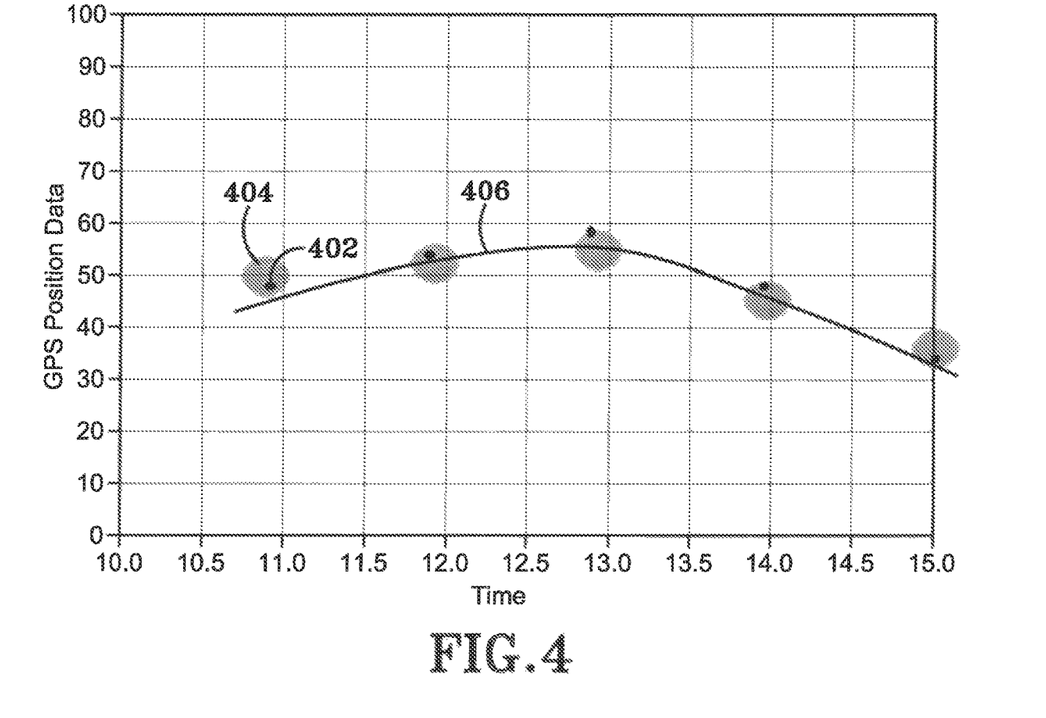
FIG. 4 is a graph of an exemplary least squares quadratic fit applied to a five second interval of global positioning system (GPS) positions versus time.

FIG. 4 is a graph of an exemplary least squares quadratic fit applied to a five second interval of GPS 32a position data points versus time to show the smoothing within the window of certain position data points. The position data points includes ground truth data 402, noisy data 404 and the least squares quadratic fit 406. As illustrated, the noisy data provides for a region of uncertainty based on the degree of noise in the system. In this example, the least squares quadratic fit determines a position estimate P(t) of the guided projectile 14 at certain position data points in the x, y and z directions according to the following equations:

$$P_x(t)=a_x+b_xt+c_xt^2 \quad \text{(Equation 1);}$$

$$P_y(t)=a_y+b_yt+c_yt^2 \quad \text{(Equation 2);}$$

and $$P_z(t)=a_z+b_zt+c_zt^2 \quad \text{(Equation 3).}$$

As shown in FIG. 4, the least squares quadratic fit sufficiently matches the ballistic path of the guided projectile 14 over the five second time period and the constraints of the projectile dynamics model to reduce the impact of the noise. In one example the window is selected to be about the peak altitude and include some data for the ascent and descent. Certain projectiles have limited or no propellant and reply primarily upon gravity and the canard control to reach the target.

The instructions in one example includes determining the reduced noise position estimate of the guided projectile 14, based, at least in part, on the smoothed portion of the plurality of position data points in the window. In other words, and in one example, the instructions are executed to determine the value of $P_x(t)$, $P_y(t)$, and $P_z(t)$ where t is time. For example, and not meant as a limitation, if the window includes five position data points, and the first position data point is at t=zero, then $P_x(4)$, $P_y(4)$, and $P_z(4)$ are smoothed estimates of the guided projectile's 10 location at t=4.

In one example, the portion of the plurality of position data points includes a first obtained position data point representing a first position of the guided projectile 14 at a first time and a last obtained position data point representing a second position of the guided projectile 14 at a second time. The first obtained data point and the last obtained data point may be provided by the guiding sensor 32a. The reduced noise position estimate of the guided projectile 14 may represent an estimated position of the guided projectile 14 at the second time. Further, the window may be configured such that the last obtained position data point represents an estimated position of the guided projectile 14 at a current time of flight. For example, and not meant as a limitation, the window includes a first position data point at t=0, a second position data point at t=1, a third position data point at t=2, a fourth position data point at t=3, and a fifth position data point at t=4, where the position data point at t=4 represents the current position of the guided projectile 14. The window may then be updated with an additional position data point and the position data point at t=0 would be discarded and the position data point at t=5 would now represent the current position of the guided projectile 14.

The instructions in one example further includes predicting a position of the guided projectile 14 representing a third position of the guided projectile 14 in the x, y and z directions at a future time using at least one projectile dynamics model. In one example, the at least one projectile dynamics model may be a three DOF model. The DOF of a mechanical system may be defined as the number of independent parameters that define its configuration.

In one example, the reduced noise position estimate of the guided projectile 14 may be a first reduced noise position estimate of the guided projectile 14 in the x, y and z directions and the instructions may further include determining a second reduced noise position estimate of the guided projectile 14 in the x, y and z directions based, at least in part, on a weighted sum of the first reduced noise position estimate in the x, y and z directions and the predicted position of the guided projectile 14 in the x, y and z directions. In one example, the second reduced noise position estimate in the x, y and z directions may be obtained by the following equations:

$$P_x(t_2)=A(P_x(t))+(1-A)(\text{predicted position, in the } x \text{ direction, of the guided projectile 10}) \quad \text{(Equation 4)}$$

$$P_y(t_2)=A(P_y(t))+(1-A)(\text{predicted position, in the } y \text{ direction, of the guided projectile 10}) \quad \text{(Equation 5)}$$

$$P_z(t_2)=A(P_z(t))+(1-A)(\text{predicted position, in the } z \text{ direction, of the guided projectile 10}) \quad \text{(Equation 6)}$$

where A is a weight. The value of the weight A may be between zero and one and depends on the noise of the guiding sensor 32a and bias effects of the at least one projectile dynamics model. In one example, weight A is 0.2; however, weight A may be any suitable value. In another example, weight A is time dependent A(t).

The instructions in this example further include determining a velocity estimate of the guided projectile 14 in the x, y and z directions. In one example, the determination of the velocity estimate in the x, y and z directions is based, at least in part, on the first reduced noise position estimate of the guided projectile 14 in the x, y and z directions. More specifically, and in one example, the velocity estimate in the x, y and z directions at a time t is determined by the following equations:

$$V_x(t)=b_x+2c_xt \quad \text{(Equation 7)}$$

$$V_y(t)=b_y+2c_yt \quad \text{(Equation 8)}$$

$$V_z(t)=b_z+2c_zt \quad \text{(Equation 9)}$$

The values of $V_x(t)$, $V_y(t)$, and $V_z(t)$ are low noise velocity estimates which provide the direction of the guided projectile 14 which are used for guidance commands of the guided projectile 14.

The instructions in one example further include predicting a velocity estimate of the guided projectile 14 in the x, y and z directions at a future time using the at least one projectile dynamics model. In one example, the at least one projectile dynamics model is a three DOF model.

In one example, the velocity estimate of the guided projectile 14 in the x, y and z directions is a first velocity estimate of the guided projectile 14 in the x, y and z directions and the instructions further include determining a second velocity estimate of the guided projectile 14 in the x, y and z directions based, at least in part, on a weighted sum of the first velocity estimate in the x, y and z directions and the predicted velocity estimate of the guided projectile 14 in the x, y and z directions. In one example, the second velocity estimate in the x, y and z directions are obtained by the following equations:

$$V_x(t_2)=A(V_x(t))+(1-A)(\text{predicted velocity estimate of the guided projectile 10 in the } x \text{ direction}) \quad \text{(Equation 10)}$$

$$V_x(t_2)=A(V_y(t))+(1-A)(\text{predicted velocity estimate of the guided projectile 10 in the } y \text{ direction}) \quad \text{(Equation 11)}$$

$$V_x(t_2)=A(V_z(t))+(1-A)(\text{predicted velocity estimate of the guided projectile 10 in the } z \text{ direction}) \quad \text{(Equation 12)}$$

where A is a weight. The value of the weight A may be between zero and one and depends on the noise of the guiding sensor 22 and bias effects of the at least one projectile dynamics model. In one example, weight A is one-fifth; however, weight A may be any suitable value. In another example, weight A is time dependent A(t).

Figure 5:
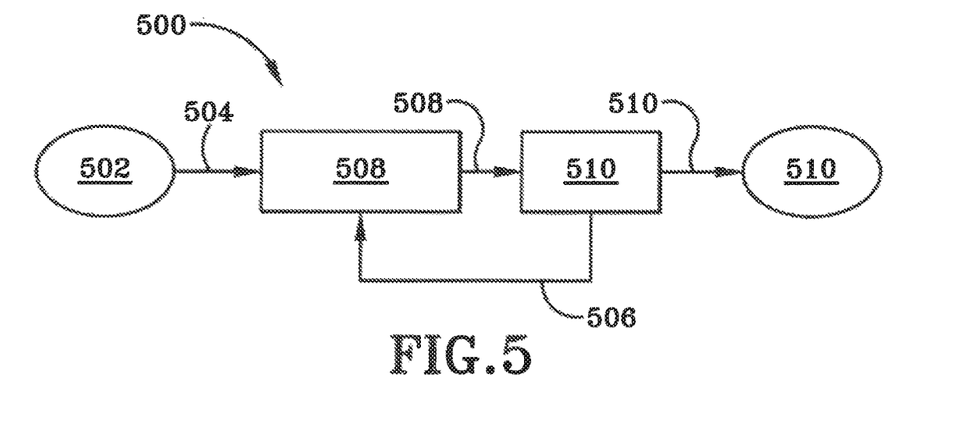
FIG. 5 is a flow chart of one method or process of the present disclosure.

FIG. 5 is a flow chart of one method or process in accordance with the present disclosure and is generally indicated at 500. As shown in FIG. 5, method 500 includes obtaining smoothed or filtered position data points, which is generally shown at 502. A measurement for t plus delta t is derived from the smoothed or filtered position data points, which is shown generally at 504. A predicted position estimate fort plus delta t is derived from the three DOF model, which is shown generally at 506. Equation 2 provides a second reduced noise position estimate, which is shown generally at 508. The three DOF model predicts an impact point 60, which is shown generally at 510. This method may be iterated to continuously provide low noise position estimates and low noise velocity estimates of the guided projectile 14 which, as further described below, allows the method to continuously predict an impact point 60 of the guided projectile 14 during the flight of the guided projectile 14.

The instructions in one example further include predicting an impact point 60 of the guided projectile 14 relative to the target 24 by using the at least one projectile dynamics model. In one example, the at least one projectile dynamics model is a three DOF model. In this example, the components of the three DOF model includes drag force, which includes an atmosphere model and a table of drag coefficients. The prediction may done by utilizing the following equations:

$$x=x+V_xdt \quad \text{(Equation 13)}$$

$$y=y+V_ydt \quad \text{(Equation 14)}$$

$$z=z+V_zdt \quad \text{(Equation 15)}$$

$$F_x=F_d(V_x/V_0) \quad \text{(Equation 16)}$$

$$F_y = F_d(V_y/V_0) \quad \text{(Equation 17)}$$

$$F_z = F_d(V_z/V_0) \quad \text{(Equation 18)}$$

$$V_x = V_x + (F_x/m)dt + D*dt \quad \text{(Equation 19)}$$

$$V_y = V_y + (F_y/m)dt + s\, dt \quad \text{(Equation 20)}$$

$$V_z = V_z + (F_z/m)dt + g\, dt \quad \text{(Equation 21)}$$

$$V_0 = \text{Sqrt}(V_x^2 + V_y^2 + V_x^2) \quad \text{(Equation 22)}$$

where g is acceleration due to gravity, s is the spin drift acceleration (parameter), D is the acceleration due to drag, and the initial values for x, y, z, $V_x$, $V_y$, $V_z$ are obtained from the guiding sensor 32a.

In one example, the three DOF model predicts what the next measurement will be, by iterating at a certain rate from current times and provides predictions of position and velocity estimates of the guided projectile 14 in the x, y and z directions, which is blended with the actual measurements of the position and the velocity of the guided projectile 14. The above-described instructions may be continually executed until the guided projectile 14 impacts the ground. The above-described instructions may be used to predict an impact point 60 and make a guidance command for the guided projectile 14. It should be understood that although the at least one projectile dynamics model has been described as a three DOF model, the at least one projectile dynamics model may be any suitable projectile dynamics model.

In another example, the at least one projectile dynamics model is an augmented three DOF model. An exemplary augmented three DOF model may be provided by the following equations which may be utilized to predict the impact point 60 of the guided projectile 14:

$$xo(t) = cx*qs \quad \text{Equation (23)}$$

where xo(t) is a drag profile for a nominal flight path;

$$xx = xx + vx*dt \quad \text{Equation (24)}$$

$$yy = yy + vy*dt \quad \text{Equation (25)}$$

$$zz = zz + vz*dt \quad \text{Equation (26)}$$

where xx, yy, and zz are the position of the projectile as a function of time and vx, vy, and vz are the components of the projectile velocity as a function of time.

$$b_g = b_g(t) \quad \text{Equation (27)}$$

where Equation (27) provides a gravity Jacobian value at t;

$$c_g = c_g(t) \quad \text{Equation (28)}$$

where Equation (28) is a gravity Jacobian;

$$b_s = b_s(t) \quad \text{Equation (29)}$$

where Equation (29) is a steering Jacobian;

$$c_s = c_s(t) \quad \text{Equation (30)}$$

where Equation (30) is a steering Jacobian;

$$el = el(t) \quad \text{Equation (31)}$$

where Equation (31) is elevation angle versus time of flight;

$$bt = b_s*dy + c_s*dz \quad \text{Equation (32)}$$

where Equation (32) is lateral acceleration due to steering;

$$ct = b_s*dz + c_s*dz \quad \text{Equation (33)}$$

$$afx = dt*xo*(vx/vo)/\text{xmass} + dt*(ct+c_g)*\sin(el) \quad \text{Equation (34)}$$

$$afy = dt*xo*(vy/vo)/\text{xmass} + dt*(bt+b_g) \quad \text{Equation (35)}$$

$$afz = dt*xo*(vz/vo)/\text{xmass} + dt*(ct+c_g)*\cos(el) \quad \text{Equation (36)}$$

$$vx = vx + afx \quad \text{Equation (37)}$$

$$vy = vy + afy \quad \text{Equation (38)}$$

$$vz = vz - g*dt + afz \quad \text{Equation (39)}$$

$$t = t + dt \quad \text{Equation (40)}$$

The $b_g$, $c_g$, $b_s$, and $c_s$ terms are derived from a Jacobian computed from a linear model where the subscript "s" or "g" refers to the steering or gravity Jacobian reference respectively. The augmented three DOF model may be modified or augmented by including the effects of steering and spin as shown in Equation (34) through Equation (36). Additionally, drag may be accounted for by using the drag profile xo(t) Equation (23) and gravity may be accounted as shown in Equation (39).

The loop may start at various times to predict a number of predicted impact points 60. For example, the augmented three DOF model may loop over Equation (23) through Equation (40) any time updated information is received, such as when a GPS 32a update is received, or at any other suitable time, in order to provide a subsequent predicted impact point 60 to the last predicted impact point 60. Further, the augmented three DOF model may loop over Equation (23) through Equation (40) until the end of the guided projectile's flight path or any other period of time.

The augmented three DOF model in one example provides an accurate prediction of the impact point 60 of the guided projectile 14. The augmented three DOF allows the effects of atmospheric drag, steering and aerodynamic trim due to spin and gravity to be taken into account. The augmented three DOF model may generate a drag profile as well as a gravity Jacobian and a steering Jacobian using a nominal flight profile. The drag profile and other key terms may be obtained using a seven DOF model to generate the nominal aerodynamic slopes for a nominal flight path. The generated aerodynamic slopes may be used to form a linear model of the guided projectile 14. The linear model may be used to obtain terms that represent the effects of spin, gravity, and steering.

The instructions in one example further include determining whether the guided projectile 14 will miss the target 24 and commanding the guided projectile 14 to move the at least one lift canard 28a, 28b, on the canard assembly 28 in response to a determination that the guided projectile 14 will miss the target 24. In other words, the instructions may make predictions of where the guided projectile 14 will end its flight, and, given those predictions, miss distances may be calculated. Once the miss distances are calculated, guidance commands may be provided to the guided projectile 14 to reduce the miss distances accordingly.

The above-described instructions may be iterated until the end of the guided projectile's 14 flight path or any other period of time. In other words, and in one example, the window is a sliding window updated at certain times (i.e. updated each time the guiding sensor 32a provides a new position data point) as the guided projectile 14 travels along its flight path and the instructions are executed each time the updated position data points are received. As such, the instructions may continuously provide a low noise position estimate and a low noise velocity estimate of the guided projectile 14 which allows the instructions to continuously predict an impact point 60 of the guided projectile 14 up until a desired point in time or until the point of impact of the guided projectile 14. Since the instructions may continuously receive updated position data points, the bias effects associated with the at least one projectile dynamics model tend to zero as the target 24 is approached. Further, in one example, the at least one projectile dynamics model provides constraints that reduce the effect of measurement noise.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Guided projectile" or guided projectile 14 refers to any launched projectile such as rockets, mortars, missiles, cannon shells, shells, bullets and the like that are configured to have in-flight guidance.

"Launch Assembly" or launch assembly 56, as used herein, refers to rifle or rifled barrels, machine gun barrels, shotgun barrels, howitzer barrels, cannon barrels, naval gun barrels, mortar tubes, rocket launcher tubes, grenade launcher tubes, pistol barrels, revolver barrels, chokes for any of the aforementioned barrels, and tubes for similar weapons systems, or any other launching device that imparts a spin to a munition round or other round launched therefrom.

In some embodiments, the munition body 12 is a rocket that employs a precision guidance munition assembly 10 that is coupled to the rocket and thus becomes a guided projectile 14.

"Precision guidance munition assembly," as used herein, should be understood to be a precision guidance kit, precision guidance system, or other names used for a guided projectile.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process steps of the present disclosure, which may incorporate some aspects of natural phenomenon, the process or method steps are additional features that are new and useful.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A precision guidance munition assembly for a guided projectile, comprising:
a canard assembly including at least one canard coupled to the precision guidance munition assembly, wherein the at least one canard is moveable;
at least one guiding sensor coupled to the precision guidance munition assembly; and
at least one non-transitory computer-readable storage medium carried by the precision guidance munition assembly having a set of instructions encoded thereon that when executed by at least one processor operates to aid in guidance, navigation and control of the guided projectile, wherein the set of instructions comprise:
obtain a plurality of raw position data during the flight of the guided projectile, including a plurality of position data points from the guiding sensor for determining positions of the guided projectile;
establish a window including a portion from the plurality of position data points;
smooth the portion from the plurality of position data points in the window, utilizing all position data points within the window; and
determine a reduced noise position estimate of the guided projectile, based, at least in part, on the smoothed portion of the plurality of position data points in the window.

2. The precision guidance munition assembly of claim 1, wherein the guiding sensor is at least one of a global positioning system (GPS), laser guided sensor, electro-optical sensor, imaging sensor, inertial navigation system (INS), and inertial measurement unit (IMU).

3. The precision guidance munition assembly of claim 1, wherein the set of instructions include:
smooth the portion from the plurality of position data points by utilizing a curve fit representing an expected trajectory shape of the guided projectile.

4. The precision guidance munition assembly of claim 3, wherein the curve fit is a quadratic fit.

5. The precision guidance munition assembly of claim 1, wherein the portion of the plurality of position data points includes:
a first position data point representing a first position of the guided projectile at a first time; and
a subsequent position data point representing a second position of the guided projectile at a second time; and
a first reduced noise position estimate representing an estimated position of the guided projectile at the second time.

6. The precision guidance munition assembly of claim 1, wherein the set of instructions further comprise:
utilize at least one projectile dynamics model to predict a future position of the guided projectile at a future time.

7. The precision guidance munition assembly of claim 6, wherein the at least one projectile dynamics model is a three degree-of-freedom model.

8. The precision guidance munition assembly of claim 6, wherein the set of instructions further comprise:
determine a second reduced noise position estimate of the guided projectile based, at least in part, on a weighted sum of the reduced noise position estimate and the predicted future position of the guided projectile.

9. The precision guidance munition assembly of claim 8, wherein the set of instructions further comprise:
determine a first velocity estimate of the guided projectile.

10. The precision guidance munition assembly of claim 9, wherein the first velocity estimate of the guided projectile is based, at least in part, on the first reduced noise position estimate of the guided projectile.

11. The precision guidance munition assembly of claim 9, wherein the set of instructions further comprise:
predict a future velocity estimate of the guided projectile at a second future time using the at least one projectile dynamics model.

12. The precision guidance munition assembly of claim 11, wherein the at least one projectile dynamics model is a three degree-of-freedom model.

13. The precision guidance munition assembly of claim 11, wherein the set of instructions further comprise:
determine a second velocity estimate of the guided projectile based, at least in part, on a weighted sum of the first velocity estimate and the predicted future velocity estimate of the guided projectile.

14. The precision guidance munition assembly of claim 1, wherein the set of instructions further comprise:
predict an impact point of the guided projectile relative to a target.

15. The precision guidance munition assembly of claim 14, wherein the impact point of the guided projectile is predicted by utilizing the at least one projectile dynamics model.

16. The precision guidance munition assembly of claim 14, wherein the set of instructions further comprise:
determine whether the guided projectile will miss the target; and
command the guided projectile to move the at least one canard accordingly.

17. A method, comprising:
providing a precision guidance munition assembly configured to be assembled as a guided projectile and launched towards a target;
obtaining a plurality of raw position data during flight of the guided projectile, including a plurality of position data points from a guiding sensor for determining positions of the guided projectile;
establishing a window including a portion of the plurality of position data points;
smoothing the portion of the plurality of position data points in the window, utilizing all position data points within the window; and
determining a reduced noise position estimate of the guided projectile based, at least in part, on the smoothed portion of the plurality of position data points in the window.

18. The method of claim 17, further comprising:
predicting a future reduced noise position estimate of the guided projectile based, at least in part, on a weighted sum of the reduced noise position estimate and a predicted position of the guided projectile.

19. The method of claim 17, further comprising:
predicting an impact point of the guided projectile relative to the target;
determining whether the guided projectile will miss the target; and
directing the guided projectile to the target by moving the at least one canard.

20. A computer program product including one or more non-transitory machine-readable mediums having instructions encoded thereon that, when executed by one or more processors, result in a plurality of operations for guiding a projectile, the operations comprising:
obtaining a plurality of raw position data during a flight of the projectile, including a plurality of position data points from at least one guiding sensor for determining positions of the projectile;
establishing a window including a portion of the plurality of position data points;
smoothing the portion of the plurality of position data points in the window, utilizing all the position data points in the window, utilizing a curve fit representing an expected trajectory shape of the guided projectile to produce a smoothed portion;
determining a reduced noise position estimate of the guided projectile, based, at least in part, on the smoothed portion of the plurality of position data points in the window;
predicting an impact point of the guided projectile relative to the target;
determining whether the guided projectile will miss the target; and
directing the guided projectile to the target by moving the at least one canard.

\* \* \* \* \*